United States Patent [19]
Tackett

[11] 4,193,249
[45] * Mar. 18, 1980

[54] HYDRAULIC DRIVE FOR LAWN CLIPPING VACUUM COLLECTOR

[76] Inventor: DeForest Tackett, Rte. 1 Box 192-A, Reddick, Fla. 32686

[*] Notice: The portion of the term of this patent subsequent to Aug. 8, 1995, has been disclaimed.

[21] Appl. No.: 880,055

[22] Filed: May 16, 1978

[51] Int. Cl.² .................................... A01D 35/262
[52] U.S. Cl. .................................... 56/11.9; 56/16.6; 56/320.2
[58] Field of Search .................... 56/320.2, 11.9, 11.6, 56/13.3, 16.6

[56] References Cited
U.S. PATENT DOCUMENTS

| | | | |
|---|---|---|---|
| 2,686,998 | 8/1954 | Miller et al. | 56/11.9 |
| 3,657,865 | 4/1972 | Ober | 56/320.2 |
| 3,903,565 | 9/1975 | Hicks | 56/320.2 |
| 3,946,543 | 3/1976 | Templeton | 56/11.9 |
| 3,974,629 | 8/1976 | Russell et al. | 56/320.2 |
| 3,987,606 | 10/1976 | Evans | 56/320.2 |
| 4,104,852 | 8/1978 | Tackett | 56/16.6 |

*Primary Examiner*—Jay N. Eskovitz
*Attorney, Agent, or Firm*—Harold Gell

[57] ABSTRACT

A controllable hydraulic power transfer system for coupling rotary energy produced at an auxiliary power take-off of a tractor type vehicle to a vehicle attachment or lug is presented herein. An exemplary adaptation of the power transfer system is presented where a riding lawn mower supports a vacuum lawn clipping collection assembly which includes a blower impeller powered by the hydraulic power transfer system.

6 Claims, 5 Drawing Figures

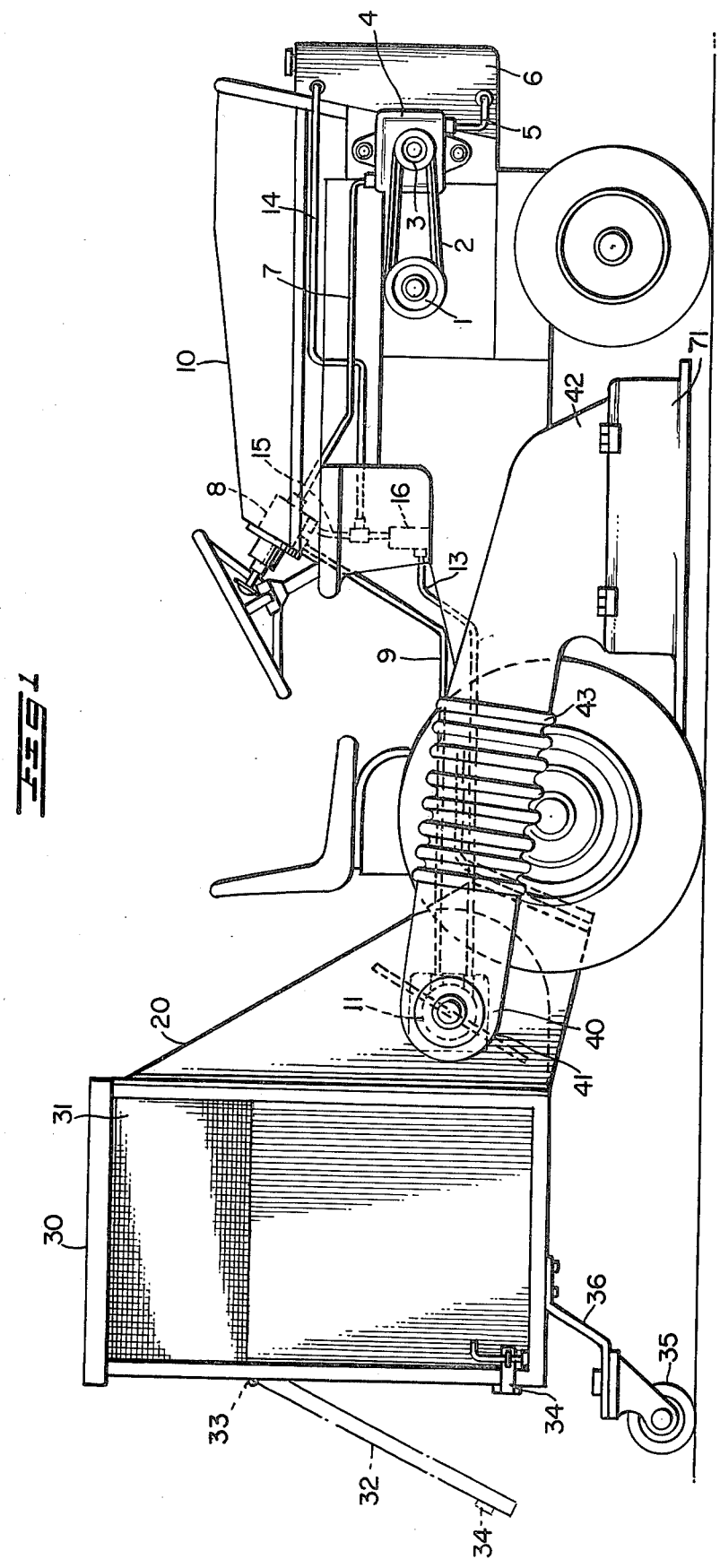

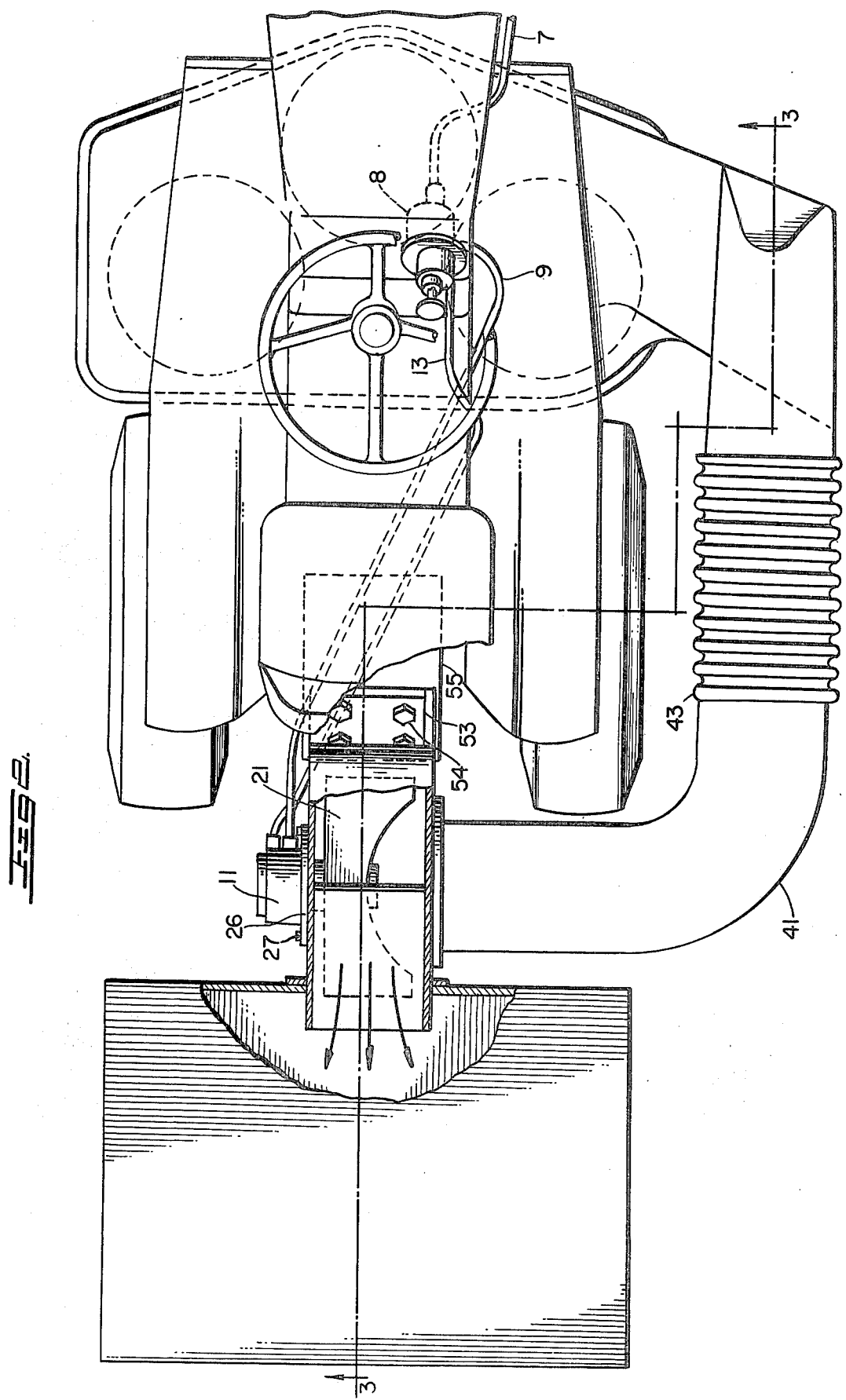

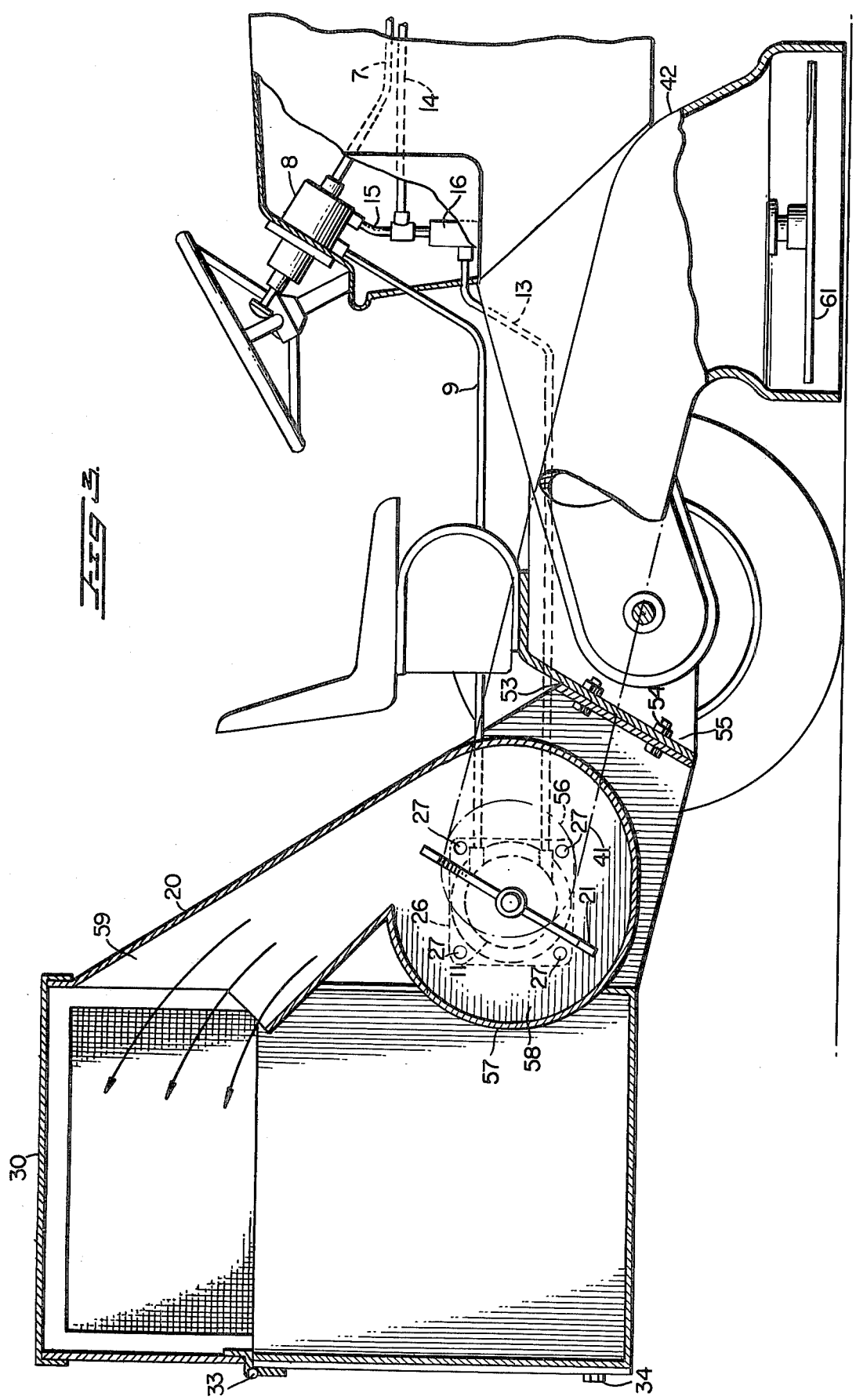

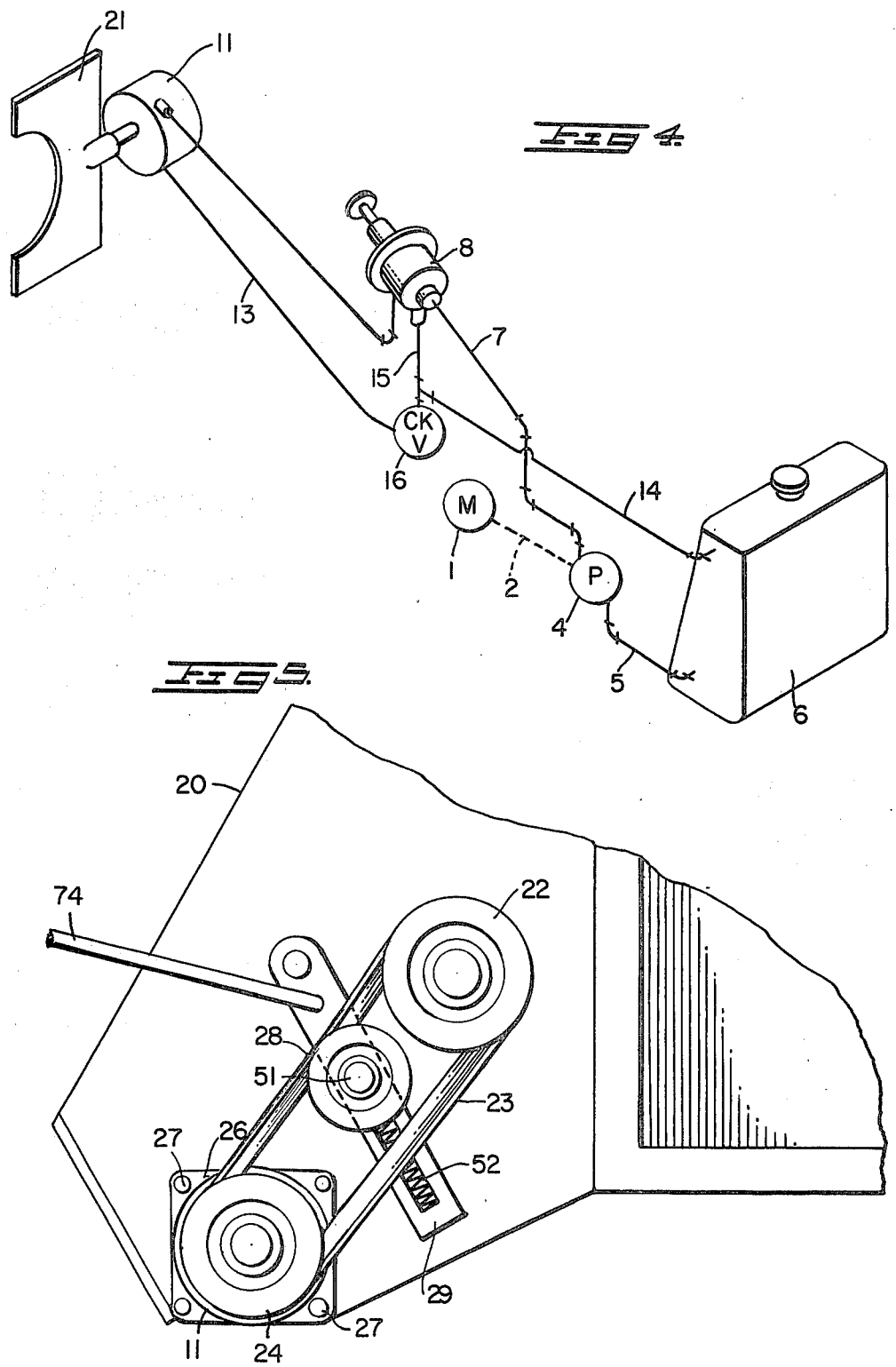

HYDRAULIC DRIVE FOR LAWN CLIPPING VACUUM COLLECTOR

THE INVENTION

This invention relates to a hydraulic power transfer system for driving rotary devices incorporated in attachments for tractor type vehicles. More specifically the invention relates to a lawn clipping collector using a vacuum conveyor to transport clippings from the vicinity of the mowing blades to a refuse container supported by a riding lawn mower.

BACKGROUND OF THE INVENTION

A relatively large variety of yard and garden tractors are utilized by home owners to carry and power a wide variety of attachments such as rotary lawn mowers, spreaders, sprayers, rollers, aerators, plows, cultivators, harrows, rotary spaders, seed planters, and snow blowers. Many of these devices incorporate rotary tools which require a driving force that is usually provided by a primary power take-off from the tractor engine. A primary example of such devices is the rotary lawn cutting attachment commonly used to convert yard and garden tractors into riding lawn mowers.

Riding lawn mowers which are specifically designed as such or which are converted yard and garden tractors produce a large volume of grass clippings which must be removed from lawns to prevent a heavy thatch of clippings from building up which will smother new grass growth, provide a hiding place for destructive insects and provide an environment suitable for the rapid growth of mold, fungus and other lawn diseases. The removal of grass clippings has been accomplished by a variety of techniques ranging from a manual rake to an elaborate vacuum cleaning system. The manual rake functions satisfactorily for a relatively small area but when large grass tracks are groomed, that method is not practical. For large tracks, tractor powered mowers normally utilize a relatively sophisticated vacuum or vacuum and sweeper devices.

An example of a prior art means for removing grass clippings produced by a tractor type lawn mower is presented in U.S. Pat. No. 3,903,565 on "Leaf And Grass Cart Bagger" issued to Littleberry T. Hicks on Sept. 9, 1975. This patent discloses a refuse container mounted in a small trailer adapted to be pulled by the grass mowing tractor. Clippings are transported from the cutting area to the refuse container via a duct vacuum transport which utilizes a blower powered by some unknown means. Presumably the blower is driven by an auxiliary internal combustion engine in a manner similar to that illustrated on Page 10 of the 1976 Yard and Garden Tractors and Attachments Catalog prepared by Sears, Roebuck & Company.

The use of an auxiliary internal combustion engine to drive a blower is undesirable for it tends to increase the complexity and cost of the grass clipping collection system. Furthermore it is an inefficient waste of petroleum products which is to be avoided in view of the constant threat of fossil fuel supply exhaustion.

Trailer systems such as the Hicks system discussed above are not satisfactory when mowing around flower beds and similar areas for as the tractor rounds the corner, the trailer will turn in an arc which will cause the wheels to destroy the corner portions of the flower bed or other structure which is being circumnavigated. In some instances, such as going around the corners of buildings, the tractor has to swing wide to prevent the trailing grass catcher from striking the corners of the building and thus the grass close to the building cannot be mowed.

S. E. Clarke in U.S. Pat. No. 3,203,022 on "Vacuum Cleaner For Lawns" issued Aug. 31, 1965 suggests a way to eliminate the need for an auxiliary internal combustion engine for powering the blower in a vacuum lawn sweeper. Unfortunately this system can be used only with vehicles having a rear wheel differential gear train that incorporates a power take-off shaft. This adds significantly to the cost of the vehicle and renders the vacuum cleaner attachment a very special purpose device fabricated for a specific type of tractor and not one which is normally found in the yard and garden market. Note that the Clarke device also incorporates a separate vacuum nozzle that adds significantly to the complexity and cost of producing the device and that it further requires a wheeled dolly to support the refuse container. The shortcomings of the wheeled dolly are similar to those discussed for the wheeled cart above.

James F. Peterson, U.S. Pat. No. 4,047,368 on "Attachment For Collecting Mower Discharge In A Plurality Of Bags" issued Sept. 13, 1977 is an example of a vacuum lawn sweeper similar to the Clarke device in that power is derived from a take-off associated with the rear wheel drive differential of the tractor. Here, as in Clarke, special adaptations to the tractor drive train must be provided to enable power to be transferred from the vehicle to the blower impeller. Also, devices such as this only provide power to the blower while the vehicle is in motion.

The various problems suggested are partially solved by the apparatus disclosed in the co-pending U.S. Pat. No. 4,104,852 of DeForrest Tackett on "Lawn Clipping Vacuum Collector" filed Nov. 8, 1976 and issued as U.S. Pat. No. 4,104,852. This co-pending patent application discloses a vacuum collector which is supported at the back of a riding lawn mower and driven by a belt drive system which couples energy from the rotary lawn mower drive shaft to the vacuum blower impeller.

All of the known prior art devices exemplified in the foregoing examples require a special purpose power take-off to drive the blower which is relatively complex and in most instances includes moving parts having relatively short useful lives such as drive belts or else they require an additional motive source such as an auxiliary engine. These shortcomings in lawn clipping vacuum collectors are also present in every type of tractor lug which includes a driven rotary tool.

OBJECTIVES OF THE INVENTION

In view of the obvious inability of the prior art systems to meet a growing need for a relatively simple, inexpensive and economical controllable power transfer system to transfer rotary energy from a garden tractor type vehicle engine to a driven rotary device in a lug, it is a primary objective of the present invention to provide a hydraulic power transfer system including a hydraulic pump driven by the vehicle engine and coupled via a flow control means to a hydraulic motor adapted to drive the rotary element within the lug.

A further objective of the present invention is to provide a relatively simple, inexpensive and economically operable grass clipping collection system for use with tractor type lawn mowers.

It is a primary objective of the present invention to provide a grass clipping collection system adapted to be driven by the same power source as the tractor through a hydraulic power transfer system.

A further objective of the present invention is to provide a power transfer system which includes a hydraulic pump that may be readily attached to a wide variety of vehicle engines and a hydraulic motor which may be attached to a wide variety of rotary devices and controlled by a flow control valve in the pump/motor loop.

A further objective of the present invention is to provide a grass clipping collector for a tractor type lawn mower which is adapted to be suspended from the rear of the vehicle to preclude the possibility of trailer wheels destroying flower beds in areas that are circumnavigated during lawn mowing operations.

A still further objective of the present invention is to provide a grass clipping collector incorporating a vacuum directed refuse conveying system adapted to transport clippings from a mower housing to a refuse container.

Another objective of the present invention is to provide a grass clipping vacuum cleaner which will run in response to an individual control means so long as the vehicle engine is operating, regardless of whether the lawn mower blades are in operation or the tractor is moving.

It is a further objective of the present invention to provide a grass clipping collector which may be easily attached to and removed from a tractor.

Another objective of the present invention is to provide a grass clipping collector attachment for a tractor type lawn mower which requires no auxiliary power source or support wheels other than that provided by the tractor.

A still further objective of the present invention is to provide a grass clipping collector for a tractor type lawn mower which may be economically produced and has a minimum number of working parts to increase product reliability.

Another objective of the present invention is to provide a hydraulic power drive for coupling rotary energy from a tractor engine to a grass clipping collector or any other tractor attachment requiring rotary energy.

The foregoing and other objectives of the invention will become apparent in light of the drawings, specification and claims contained herein.

SUMMARY OF THE INVENTION

Presented hereby is a hydraulic power transfer system for coupling rotary energy from a vehicle such as a tractor type lawn mower to an attachment such as a grass clipping vacuum collector.

The system is comprised of a hydraulic pump adapted to be attached to and driven by a tractor engine and a hydraulic motor adapted to be attached to a variety of rotary devices and coupled to the hydraulic pump via a flow control means. In the exemplary system presented herein the hydraulic motor is coupled to a blower impeller contained within a rigid blower housing including means to mechanically affix the housing to the rear of a tractor. The housing also includes mounting means adapted to support the hydraulic motor and a rigid refuse container. The rigid refuse container is permanently secured to the housing so that it will be supported by the tractor via the blower housing. The refuse container incorporates vent means which permit air to escape but retain grass clippings within the container.

The container also includes an access door which will permit cleaning of the container after use and a skid which will prevent an excessively heavy load of what grass clippings within the container from upsetting the tractor by radically shifting its center of gravity.

A vacuum conveyor system is provided between the vacuum blower and the lawn mower blade housing. This conveyor is in the form of a duct incorporating a flexible segment to allow for the floating action of the lawn mower blade housing.

DESCRIPTION OF THE DRAWINGS

FIG. 1 is a side view of the hydraulic power transfer system adapted to drive a grass clipping collector and vacuum attachment installed on a tractor type lawn mower.

FIG. 2 is a top view of the tractor and grass clipping collector and hydraulic motor with portions broken away and shown in section.

FIG. 3 is a cutaway view along the line 3—3 of FIG. 2 illustrating the vacuum blower and its association with the conveyor duct and refuse container.

FIG. 4 is a styalized schematic diagram of the hydraulic power transfer system.

FIG. 5 is a detailed view of an alternate embodiment incorporating a pulley drive train and belt tensioning means.

Referring to the drawings, FIG. 1 presents a side view of the grass clipping collector affixed to a tractor 10. The assembly consists of a blower duct housing 20 which functions as a mounting bracket adapted to support the refuse storage bin 30 and the duct conveyor 40. The duct conveyor includes a rigid duct 41 affixed over an opening in the blower duct housing 20, an adapter 42 connected to the lawn mower blade housing 11 and a flexible duct coupling the adapter 42 to the rigid duct 41.

The refuse storage bin 30 incorporates a screened portion 31 in the upper sector of at least one side and preferably on two sides. This screen provides a means for exhaust air to leave the refuse storage bin without a buildup of undue pressure which would hamper the operation of the system. The refuse storage bin also includes an access door 32 which is located at the back of the bin and supported by hinges 33 which permit the door to be opened for easy access to the interior of the bin. A latch 34 is provided to prevent accidental opening of the refuse storage bin during use. A wheel or caster 35 is coupled to the bottom of bin 30 by a spring bias arm 36. The wheel 35 and spring bias arm 36 are provided to support the refuse storage bin 30 when the effective center of gravity of the tractor shifts due to vehicle acceleration and/or an excessively heavy load of grass clippings in the storage bin. An alternate embodiment is considered wherein the wheel is replaced by a skid to simplify the mechanism.

An engine auxiliary drive pulley 1 (see FIGS. 1 and 4) commonly found on many garden tractors is coupled by a drive belt 2 to pulley 3 which is secured to the shaft of hydraulic pump 4. The hydraulic pump is secured to the engine or engine mounting means in a preferred embodiment to eliminate excessive strain on the drive belt 2 which could be caused by vibration between the engine and tractor chassis.

The hydraulic pump 4 may be any one of a variety of commercially available hydraulic pumps such as the Model D-21 produced by Delta Power Hydraulic Company. The output of the pump 4 is coupled via hydraulic line 7 to control valve 8 which in a preferred embodiment is a hydraulic control valve of the type which has a single input and two outputs having a variable output ratio therebetween such as a Gressen Model S-50.

The control valve 8 is secured to the tractor instrument panel where it may be easily manipulated by the tractor operator. One output of the valve is coupled via hydraulic line 9 to a hydraulic motor 11 which may be any one of the numerous commercially available motors such as the Model D-23M produced by Delta Power Hydraulic Company. The hydraulic fluid, after driving the motor 11, is returned to the system via hydraulic lines 13 and 14 which transfer the expended hydraulic fluid to the hydraulic fluid reservoir 6. The hydraulic fluid reservoir 6 in a preferred embodiment is a five gallon tank which helps counter balance the weight of the refuse storage bin 30 and supplies hydraulic fluid via hydraulic line 5 to the hydraulic pump 4.

When the hydraulic control valve 8 is placed in any position other than the position which allows 100% of the hydraulic fluid to flow through hydraulic line 9, the surplus hydraulic fluid is transferred through hydraulic line 15 and hydraulic line 14 to the hydraulic storage tank 6. A one-way valve 16 is incorporated in hydraulic line 13 to prevent the surplus hydraulic flow in line 15 from creating back pressure in the hydraulic motor which could stall the motor or cause it to attempt to operate in a reverse direction.

FIG. 2 is a top view of the grass clipping collector attached to a tractor. This view is partially cut away to illustrate the location of the blower impeller blades 21 and hydraulic motor 11. FIG. 2 and FIG. 3 illustrate the blower housing coupling flange 53 which includes four nuts and bolts 54 adapted to secure the housing to flange 55 on the back of the tractor.

The cutaway view of FIG. 3 illustrates the opening 56 in the blower duct housing 20 to which rigid duct 41 is connected. The hydraulic motor 11 is supported by a mounting flange 26 which is rigidly fastened to the side of the duct housing 20 opposite the blower duct opening 56 by a plurality of fasteners 27.

When the system is in operation, clippings produced by lawn mower blades 61 of FIG. 3 are drawn into adapter 42 and through the duct work into the blower duct housing by the blower impeller blades 21. A channel is provided within the blower duct housing by a curved wall 57 adapted to form an impeller cavity 58 and exhaust duct 59 which channels refuse into the refuse storage bin 30. The duct work and blower duct housing include relatively rigid materials which permit the assembly to function as a mounting bracket for securing the refuse collection bin 30 to the tractor.

FIG. 5 illustrates an alternate embodiment which eliminates control valve 8, bypass hydraulic line 15 and one-way valve 16. In this embodiment hydraulic fluid is pumped directly from the hydraulic pump 4 to the hydraulic motor 11 and returned to the hydraulic pump via a hydraulic reservoir which may be a relatively small surge tank. Control of the impeller is provided by the pulleys illustrated in FIG. 5. The hydraulic motor 11 is constantly running as long as the vehicle engine is operating. A belt 23 couples hydraulic motor pulley 24 to an impeller driving pulley 22. The belt is slack so that the impeller is not driven unless tensioning pulley 28 supported on a spring biased shaft 52 is moved by lever means 74 and 29 to tension belt 23. Spring means 52 provides a bias against the tensioning pulley supporting shaft 51 so that the pressure exerted via control lever 74 and support lever 29 is resilient.

Control lever 74 is sufficiently long to enable the operator to manipulate the lever with one hand while operating the tractor.

Although preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim as a new and useful contribution to the art and for which I desire letters patent is:

1. A hydraulic drive lawn clipping vacuum collector attachment for a tractor lawn mower driven by an internal combustion engine and incorporating a power takeoff, a driven grass cutting blade contained within a housing and a rear hitch mounting plate, comprising:

a refuse storage bin;

a mounting bracket affixed to said refuse storage bin and adapted to be rigidly secured to said tractor, said mounting bracket adapted to support said refuse storage bin suspended above ground levels;

a blower housing incorporated in said mounting bracket;

an impeller contained within said blower housing;

a duct coupling said lawn mower blade housing to said refuse storage bin;

a hydraulic pump driven by said power takeoff of said internal combustion engine, said hydraulic pump including a fluid inlet and fluid outlet;

a rotary hydraulic motor, including a fluid inlet and a fluid outlet;

said hydraulic motor incorporating a rotary shaft for supporting and driving said impeller;

said hydraulic motor supported by said blower housing;

a first hydraulic fluid transfer means for coupling hydraulic fluid from said hydraulic pump fluid outlet to said rotary hydraulic motor fluid inlet, said first hydraulic fluid transfer means includes a control valve means for regulating the volume of fluid flow from said hydraulic pump to said rotary hydraulic motor;

a second hydraulic fluid transfer means for coupling hydraulic fluid from said rotary hydraulic motor fluid outlet to said hydraulic pump fluid inlet, said second hydraulic fluid transfer means includes a hydraulic fluid reservoir including a hydraulic fluid outlet coupled to said hydraulic pump fluid inlet and an inlet coupled to said rotary hydraulic motor fluid outlet; and said control valve includes bypass means to direct surplus hydraulic fluid from said first hydraulic fluid transfer means to said second hydraulic fluid transfer means and said second hydraulic fluid transfer means includes a one-way valve coupled to said rotary hydraulic motor fluid outlet to prevent surplus hydraulic fluid from said bypass means from entering said rotary hydraulic motor.

2. An apparatus as defined in claim 1, wherein said duct comprises:

a vacuum conveyor duct means for transporting refuse to said refuse collection bin via said blower housing.

3. An apparatus as defined in claim 2 wherein said tractor lawn mower blade housing includes a lawn clipping discharge opening coupled to said vacuum conveyor duct means.

4. An apparatus as defined in claim 2, comprising:
a wheel; and
a mounting strut means for securing said wheel to the bottom of said refuse collection bin.

5. An apparatus as defined in claim 1 wherein said rotary hydraulic motor is adapted to drive a rotary tool means transported by said vehicle.

6. An apparatus as defined in claim 1 wherein said rotary hydraulic motor includes an output shaft and said impeller includes a drive shaft, comprising:
a first pulley secured to said rotary hydraulic motor output shaft;
a second pulley secured to said impeller drive shaft;
an endless loop drive belt for coupling rotary energy from said first pulley to said second pulley; and
a tensioning pulley means for selectively applying pressure to said endless loop drive belt to cause engagement between said belt and said first and second pulleys.

* * * * *